United States Patent [19]

Tschulena

[11] Patent Number: 5,437,186
[45] Date of Patent: Aug. 1, 1995

[54] INTEGRATED OPTICAL ACCELERATION SENSOR

[76] Inventor: Guido Tschulena, Reichenberger Strasse 5, W-6393 Wehrheim, Germany

[21] Appl. No.: 971,617

[22] Filed: Nov. 6, 1992

[30] Foreign Application Priority Data

Nov. 6, 1991 [DE] Germany .................. 41 36 510.0

[51] Int. Cl.$^6$ .................... G01P 15/08; H01J 5/16
[52] U.S. Cl. .................... 73/514.26; 73/653; 250/227.21
[58] Field of Search ............. 73/517 R, 653; 250/227.21, 227.28, 231.11

[56] References Cited

U.S. PATENT DOCUMENTS

| 3,789,674 | 2/1974 | Anderson et al. | 73/517 R |
| 4,353,259 | 10/1982 | Schneider, Jr. | 73/517 R |
| 4,428,234 | 1/1984 | Walker | 73/517 R |
| 4,477,732 | 10/1984 | Mausner | 307/9 |
| 4,595,830 | 6/1986 | McMahon | 73/517 R |
| 4,800,267 | 1/1989 | Freal et al. | 73/517 R |
| 4,848,871 | 7/1989 | Seidel et al. | 73/653 |
| 4,860,586 | 8/1989 | Miers et al. | 73/517 R |
| 4,948,960 | 8/1990 | Simms et al. | 250/227.11 |
| 5,276,322 | 1/1994 | Carome | 73/517 R |

FOREIGN PATENT DOCUMENTS 3007462 10/1980 Germany .

OTHER PUBLICATIONS

Roylance et al, "A Batch-Fabricated Silicon Accelerometer", IEEE Transactions on Electron Devices, vol. ED-26, No. 12, Dec. 1979.
Gerlach-Meyer, "Micromachined Capacitive Accelerometer", Sensors and Actuators, A, 25–27, 1991, pp. 555–558.
Soviet Inventions Illustrated, vol. W., No. 4, Issued Apr. 3, 1975, p. 8, SU 420935.

Primary Examiner—Hezron E. Williams
Assistant Examiner—Helen C. Kwok
Attorney, Agent, or Firm—Spencer, Frank & Schneider

[57] ABSTRACT

An acceleration sensor for measuring accelerations in at least one direction, the sensor including: a plate-like seismic mass which responds to accelerations, is disposed within a fixed frame and is movably fastened to the frame by at least one web extending between the mass and the frame. A first light waveguide for receiving a light beam from a light source, is disposed on a surface of the seismic mass so that a light beam passing therethrough is deflected as a function of movement of the seismic mass, and a second light waveguide is disposed on a surface of the fixed frame opposite an end of the first light waveguide for coupling the light beam to a detector for detecting deflections of the light beam as a measure of detected acceleration by the sensor. Preferably, the first and second light waveguides comprise planar light conductor paths or strips and the mass, webs and frame are all formed of silicon. The mass may be fastened to the frame by webs along only one edge surface of the mass in the form of a cantilever, or by two webs at opposite edge surfaces of the mass. According to a further and slightly different embodiment, the mass may be fastened to the frame by four webs to provide movement in two different directions.

12 Claims, 5 Drawing Sheets

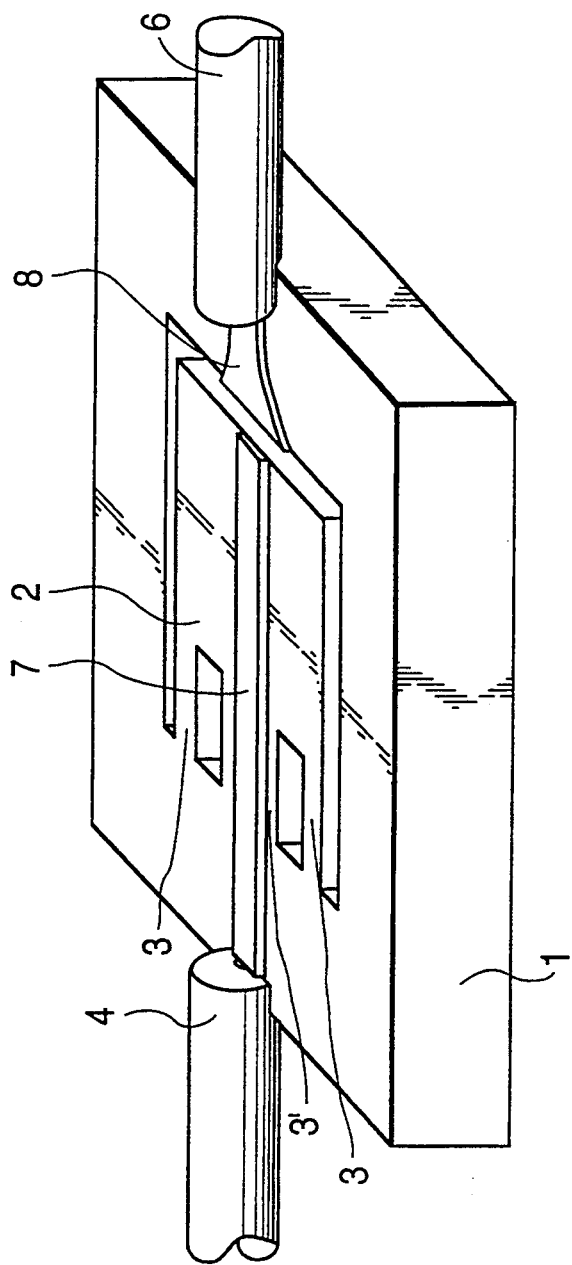

INTEGRATED OPTICAL ACCELERATION SENSOR

BACKGROUND OF THE INVENTION

The present invention generally relates to an acceleration sensor for measuring accelerations in one or a plurality of directions by means of a plate-like seismic mass that responds to the accelerations and is movably held by one or a plurality of webs, wherein a light beam from a light source is directed onto or over the seismic mass and is deflected as a function of the movement of the seismic mass, and wherein the deflected light is directed to at least one optical detector which measures the deflections as a function of the acceleration. An acceleration sensor having these features is disclosed, for example, in U.S. Pat. No. 3,789,674. More particularly, the present invention is directed toward such acceleration sensors which are produced, for example, as silicon micromechanisms and are composed of a plate-like seismic mass which is held by one or a plurality of webs so that the mass is able to react to the accelerations to be measured with a corresponding movement.

A plurality of such acceleration sensors have been developed in which seismic masses are connected, either on one side or edge or at opposite sides (edges) by one or a plurality (usually two) of webs with a fixed, i.e. stationary or rigid silicon frame. Examples can be found in the following publications: (a) "A Batch Fabricated Silicon Accelerometer", IEEE Trans. Electron. Devices, ED-26 (1979), 1911; and (b) "Micromechanic Capacitive Accelerometer", U.E. Gerlach-Meyer, Sensors and Actuators A, 25-27 (1991), page 558 et seq. In order to be able to record the movement of the seismic mass, measurements are made in (a) of changes in resistance in a piezo-resistor integrated in the web, or in (b) of changes in the voltage of the seismic mass configured as a capacitor plate relative to one or a plurality of fixed electrodes. In case (a) the great temperature dependence of the integrated resistors poses problems. In case (b), the temperature dependence is somewhat less, in principle, but the capacitance read-out is connected with greater expenditures for electronic equipment. The design of such capacitive acceleration sensors further requires special expenditures with respect to the attenuation and frequency behavior of the sensor due to the displacement of the quantity of air between the capacitor plates. The adjustment of the capacitor plates relative to one another and the design and mounting of the seismic plate are correspondingly critical. Far-reaching miniaturization encounters limits since they require capacitor surfaces in the $mm^2$ range in order not to obtain excessively low capacitance values in the pF range and less.

For both of the above arrangements it is difficult to realize sensors that respond to accelerations in more than one direction. This also applies for the following, optically designed acceleration sensors in which the optical coupling, for example, between two optical fibers changes as a function of the acceleration to be monitored.

The above-mentioned U.S. Pat. No. 3,789,674 discloses an acceleration sensor which is provided with a cantilever arm that is held within a housing by means of an adjustment screw and supports a seismic mass whose top surface is made reflective and is disposed below a light source that is arranged in the ceiling of the block-shaped housing. On both sides of the light source, photocells are attached to the housing ceiling. These photocells receive different light reflection percentages depending on the acceleration acting on the seismic mass.

Federal Republic of Germany Laid-Open patent application No. DE 3,007,462.A1 discloses a shock indicator in which a single-fiber optical conductor is brought through each one of two oppositely disposed housing walls, with the one conductor projecting relatively far into the housing and there facing the other, shorter conductor that has been introduced less far into the housing. The indicator also includes a pushed-over sleeve, that serves as the seismic mass, for the longer conductor. If there are shocks, the longer optical conductor, which is configured as a spring, is excited to vibrate in some plane in its longitudinal axis so that the optical coupling between the photoconductors is periodically interrupted.

In Sov. Inv. Illustrated, Volume W, No. 4, published Mar. 4, 1975, page 8, SU 420935, a seismic mass is pressed by means of a spring against a holding plate in a housing. The end surface pressed against the holding plate is made reflecting where it faces the end faces of two optical fibers that are brought through the mounting plate. If accelerations perpendicular to the holding plate occur, the seismic mass leaves the plane of the holder as soon as the inertial force acting on it exceeds the force of the spring, so that a gap is formed which is sufficient to close the light path or light circuit via the reflecting surface of the seismic mass so that the light is conducted through the optical conductors and analyzed.

SUMMARY OF THE INVENTION

It is the object of the present invention to improve an acceleration sensor of the above-mentioned type in such a way that it can be realized particularly easily and compactly from an engineering point of view while providing satisfactory accuracy.

The above object is achieved by a first solution according to the invention utilizing a number of embodiments for measuring accelerations in one direction. According to this solution, the sensor includes a plate-like seismic mass that is held at one or a plurality of webs within a fixed frame, for example in the manner of a cantilever arm. The surface of the seismic mass is provided with a first light waveguide, for example an optical fiber or preferably a further light wave conductor in the form of a planar, layer-like waveguide path (e.g. a silicon oxide path or layer), into which light is fed by a light source. The sensor further includes at least one further waveguide, e.g. an optical fiber or preferably a further light wave conductor path or layer, on the fixed frame which receives the light beam that is conducted through the first light waveguide and deflected as a function of the movements of the seismic mass, and transmits it to, for example, one or a plurality of photodetectors for detecting the deflection of the light beam. The light fed into the first light waveguide may come, for example, from a lamp, an LED (light-emitting diode) or a laser diode. With the preferred embodiment wherein planar light waveguide conductor paths or layers are used for both waveguides, a completely integrated acceleration sensor is provided.

In addition to the cantilever-like mounting of the seismic mass, it may also be held by two oppositely disposed webs. In that case, the light waveguide on the seismic mass, instead of extending in a straight line from the one end to the other end, is subjected to a change in direction toward the lateral edge of the seismic mass, where it again lies opposite the light conductor on the fixed frame.

The preferred arrangement utilizing light wave conductor paths or layers is extremely compact and cost effective and can be produced, for example, as a silicon micromechanism. Compared to solutions employing optical fibers attached to the seismic mass, greater accuracy and sensitivity can be realized with this preferred arrangement. The motion behavior of the seismic mass is not changed by the light waveguide paths. Moreover, the silicon oxide layer paths or strips are more easily attached than light waveguide fibers which would have to be accurately embedded in the seismic mass. Furthermore, more far-reaching miniaturization can be realized in this way and it is possible to employ mass production methods.

Sufficiently tested and optimized light sources or photodetectors (e.g. photodiodes, CCD (charge coupled device) diodes and laser diodes) are disclosed and known, primarily in the optical communications, video and measuring art. They are distinguished by the possibility of operating at up to very high frequencies. This also applies for the light waveguides that are coupled to them.

Preferably, the light from the light source is coupled by way of an optical fiber into the first light waveguide layer or path which is fixed to or disposed on the fixed frame adjacent one of its inner edge surfaces. The coupling out from the second light waveguide layer or path, which preferably is broader (wider) than the first light waveguide path, may be effected by way of a further light conductive fiber disposed on the opposite edge surface of the frame. The technical efforts for fixing (securing) and positioning the optical fibers are low.

Thus it is easily possible to fix the optical fibers to the silicon frame, from which extend the webs for holding the seismic mass, by partially embedding the fibers in the frame. Preferably, this is accomplished by employing <100> oriented monocrystalline silicon wafers into which high precision V-shaped channels can be cut in a known manner by means of anisotropic etching.

The application of waveguide layer or paths on silicon, preferably in the form of silicon oxide coatings, can be accomplished by means of known thermal oxidation and coating processes and corresponding masking processes. Alternatively, easily attached waveguides are composed of $Si_3N_4$, $Al_2O_3$, $Ta_2O_5$, $GeO_2$ or also of combinations of layers and materials.

By using juxtaposed transmitting or receiving light waveguides or optical fibers it is possible to make a conclusion as to the deflections of the seismic mass from the presence or absence of associated received signals.

The optical solution according to the invention additionally makes it possible to employ simple arrangements for measuring accelerations from different directions. In addition to the possibility of, for example, working with two mutually perpendicularly arranged seismic masses that are each held by individual, relatively narrow webs having a thick depth which permit the picking up of accelerations in two direction in one plane (parallel to the plane defined by the silicon frame), the present invention provides a further solution utilizing only one seismic mass which is described below and is preferred to create a compact sensor for accelerations from several directions.

According to a further embodiment of an acceleration detector according to the invention, a single plate-shaped seismic mass is held all around by four webs each extending in a respective direction, in each case starting at a different respective corner of the rectangular frame and extending along one peripheral side of the rectangular seismic mass, with the attachment being such that the seismic mass is able to vibrate in two mutually perpendicular directions. This arrangement as well is extremely compact and can be realized economically.

A light beam is directed onto this seismic mass, for example, by way of an optical fiber that is fastened to the edge of the frame. The light beam impinges on a sloped reflection device that is fastened to the surface of the seismic mass. The reflection device reflects the light beam onto a location sensitive planar photodetector, for example, in the form of a locally resolving photodiode or also a CCD photodiode matrix arrangement.

Instead of coupling in by way of a light conductive fiber, the coupling in may also be effected in integrated technology by way of a light waveguide. Finally it is possible to direct the light beam from the light source obliquely onto a planar reflecting structure (grid-shaped or corrugated), which is attached to the seismic mass and has the property of directing the light beam in the manner of a Fresnel mirror at a defined angle onto a detector surface of the above type whose signals indicate the point of incidence and reflect the motion amplitude and thus the acceleration.

In addition to the preferred embodiment as a silicon micromechanism, both solutions according to the invention can also easily be configured, for example, to employ punched metal components or injection molded plastic components for frame and webs and for the seismic mass.

For all solutions with or without mechanical coupling of a light waveguide to the movement of the seismic mass, the frequency behavior no longer depends on shifts in the air between opposing surfaces and, since the displacement of the light beam and its optical detection requires practically no restrictions in this respect, the frequency behavior is predetermined only by the suspension of the seismic mass.

The acceleration sensors according to the invention are suitable for attachment to all possible movable components whose acceleration is to be measured. One use lies in the pickup of acceleration in motor vehicles, for example in order to reliably actuate safety devices such as air bags when there is a collision head-on or from the side.

Another use is the seismic monitoring of safety devices, for example in order to turn off gas conduits after an earthquake so as to prevent fires. The sensor according to the invention can also be employed to monitor damage on machines, that is at bearings, pumps, turbines and the like.

It is possible to simultaneously provide the sensor according to the invention with capacitance measuring devices and, for example, effect an advantageous electrostatic feedback connection to control the vibration behavior and particularly for read-out.

The invention will now be described below in greater detail with reference to the drawing figures.

BRIEF DESCRIPTION OF THE DRAWINGS

FIGS. 3a, 3b and 3c schematically depict respective further, preferred embodiments of the acceleration sensor according to the invention.

DETAILED DESCRIPTION OF THE PREFERRED EMBODIMENTS

The embodiments to be described below represent acceleration sensors that are produced as silicon micromechanisms. However, there are a number of alternatives for the production of the embodiments and for the sensor according to the invention in general. For example, correspondingly punched metal components or injection molded plastic components can easily be employed instead of silicon components.

Figure 1:
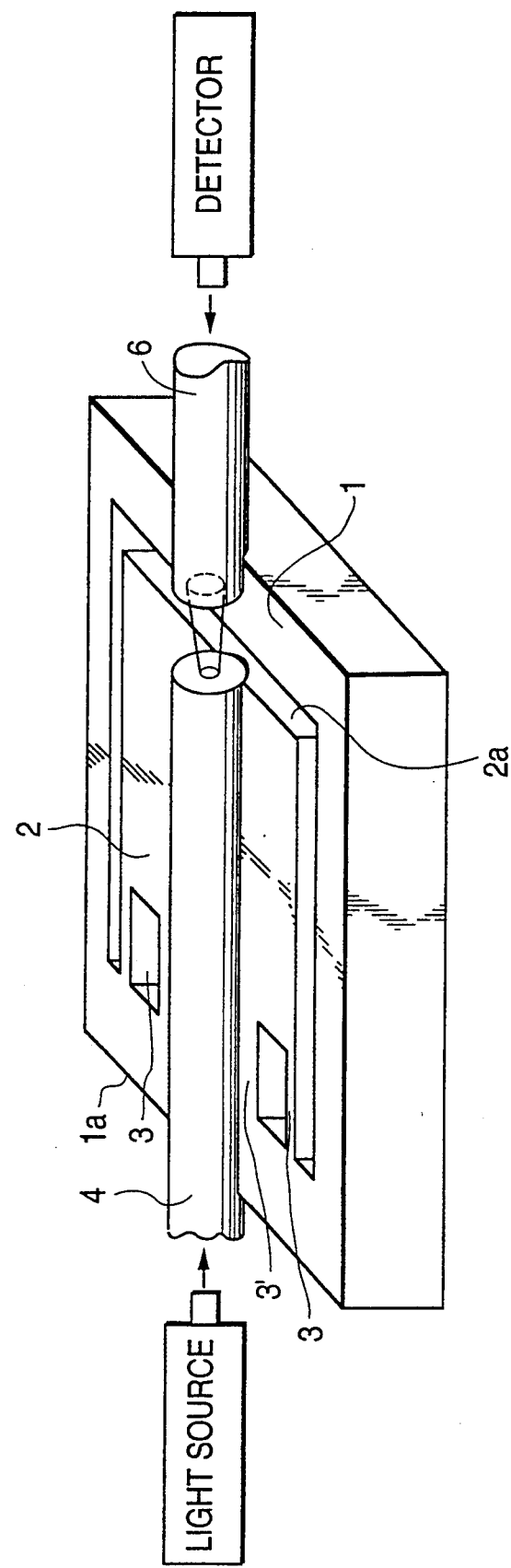
FIG. 1 is a schematic illustration of an acceleration sensor according to the invention which is provided with optical fibers.
Figure 2:
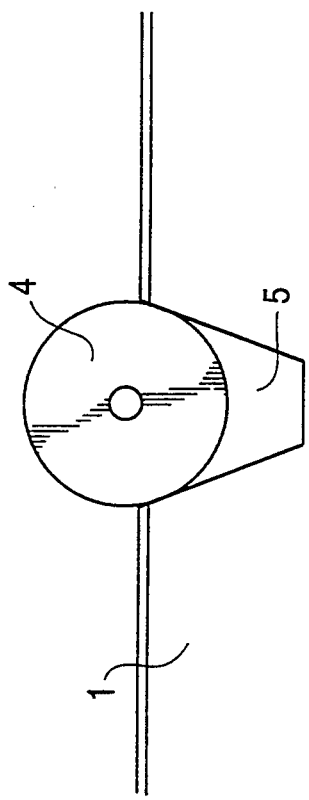
FIG. 2 is an end view showing a possible way for fixing or mounting the optical fiber of FIG. 1 to the frame and/or seismic mass of the acceleration sensor.

The linear, one-dimensional acceleration sensor of FIG. 1 includes a silicon chip 1 (thickness approximately 500 μm), which forms a fixed edge or frame, out of which a movable seismic mass 2 has been worked in a known manner by way of preferably an anisotropic etching process employing a 50% KOH solution at 70° C. This seismic mass 2 is held at the left-hand edge (in the drawing) of frame 1 by two thin outer elastic webs 3 (approximately 80 μm thick and 80 μm wide) and a thicker wider, central web 3' in the manner of a cantilever arm. Midway between the two outer webs 3, an optical fiber 4 is fixed or fastened in a V-shaped channel 5 (having a depth of approximately 120 μm) which extends from the outer edge surface 1a of frame 1 across the central web 3' to the free right end or edge surface 2a of the seismic mass 2. In the illustrated embodiment a <100> silicon wafer is employed into which such channels 5 can be etched with great precision, for example, by wet chemical anisotropic etching. The side wall of the channel 5 is sloped at about 54° relative to the horizontal as shown in FIG. 2 to form the generally V-shaped groove or channel.

A further optical fiber 6, which serves as a receiving fiber for a bundle of light beams conducted through optical fiber 4 from a light source, for example, in the form of a photodiode, is embedded in the surface of the frame (within a V-shaped groove) opposite the fiber 4. A light detector, e.g. a silicon photodiode or phototransistor, is connected to the receiving optical fiber 6 for detecting differences in the light transmission due to movement of the free end of optical fiber 4, in the case of acceleration-caused deflections of seismic mass 2 in the directions indicated by the arrows. As is known from the technology of optical connectors and plug-in connectors, if the fiber ends are arranged in sufficient density, the light transfer is sufficiently linear up to vibration amplitudes of about 1.5 times the fiber core radius. The distance between the facing ends of the fibers 4 and 6 is here preferably made smaller than the fiber core diameter. Acceleration-caused displacements of one of these fibers i.e, the fiber 4, are determined from the change in the light transmission between the fibers 4 and 6 which are disposed closely opposite one another in any case. Measurements to an accuracy of about 1% are possible for displacements of up to about 1.6 times the fiber core radius.

In FIG. 3a, the embodiment of FIG. 1 has been modified to the extent that the optical fiber 4 from which the measuring beam emanates is only fixed or fastened to the surface of the fixed frame 1 adjacent the edge surface 1a. The light leaving fiber 4 is fed, for example, into a silicon oxide waveguide layer or film 7 which extends in the form of a coated strip from fiber 4 to the free end 2a of seismic mass 2 and has a layer thickness of about 0.1 μm $SiO_2$. Opposite to the frontal surface of the waveguide path or layer 7 at the free end 2a of seismic mass 2, a waveguide layer or film 8 of silicon oxide has been applied to the surface of frame 1 and extends from the inner edge of frame 1 to the receiving optical fiber 6, tapering in the manner shown in FIG. 3 from a width which is more than double the width of waveguide strip 7 to a width that approximately corresponds to the width of the strip 7. For safety's sake, light waveguide 8 preferably is also made thicker than light waveguide 7.

The optical fibers 4 and 6 are here disposed in channels 5 in the mass 2 and the frame 1, respectively, to such an extent that the fiber core in each case lies opposite the light waveguide strip 7 or 8, respectively. As in the embodiment of FIG. 1, the deflection of the seismic mass 2 can then be determined by a change in the intensity of the detected light beam which indicates a linear change as a function of the motion amplitude.

The silicon wafer 1 is preferably composed of <100> monocrystalline silicon that is popular in the electronics art and into which troughs or channels 5 can easily be worked.

In both described embodiments, several optical fibers or waveguide strips or layers may be employed on the light feed-in side as well as on the receiving side. If, for example, an additional optical fiber is provided above or below the receiving fiber 6 to receive light only if there are predetermined higher acceleration values, it is possible in this way to realize a very simple switch for actuating an acceleration dependent mechanism. If several optical fibers are employed, several light sources and several discrete photodetectors or multi-photodetectors are employed correspondingly.

Figure 3B:
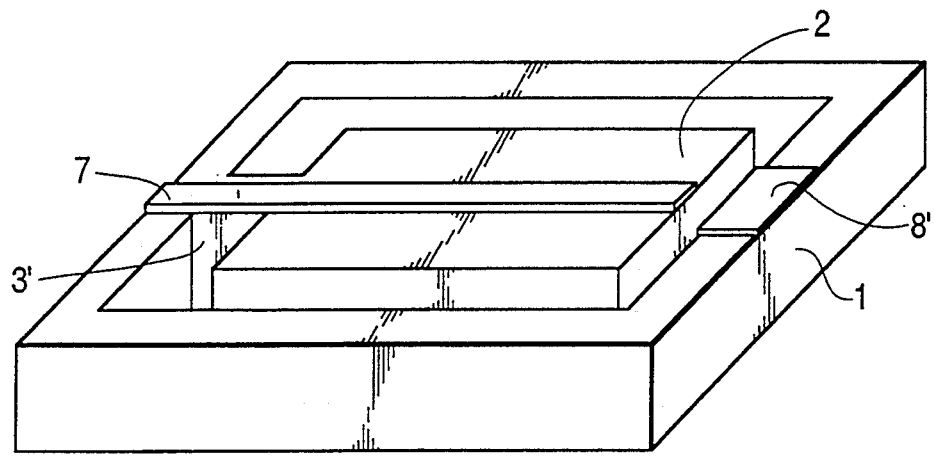

FIG. 3b shows another embodiment which is a modification of FIG. 3a and in which still further miniaturization is possible since it is completely without optical fibers. In this embodiment the seismic mass 2 is held by a single web 3' which is connected with the frame 1. Via a non-illustrated light source, light is fed into the first light waveguide 7 and the light received by a second light waveguide layer 8' is transmitted to a photoelectric detector unit (not shown).

If, in contrast to the embodiments of FIGS. 1, 3a and 3b, a sensor is to be realized for accelerations in the direction of the plane defined by the wafer, this is done, for example, by holding the seismic mass 2 by means of a web 3' that is very narrow and has a great thickness in depth (from the top surface to the bottom surface of the wafer). If two such cantilever-like structures are arranged perpendicular to one another in one plane, it is possible to measure acceleration in two planar perpendicular directions.

The above embodiments employ unilaterally held seismic masses 2 to detect vibrations in one direction.

Figure 3C:
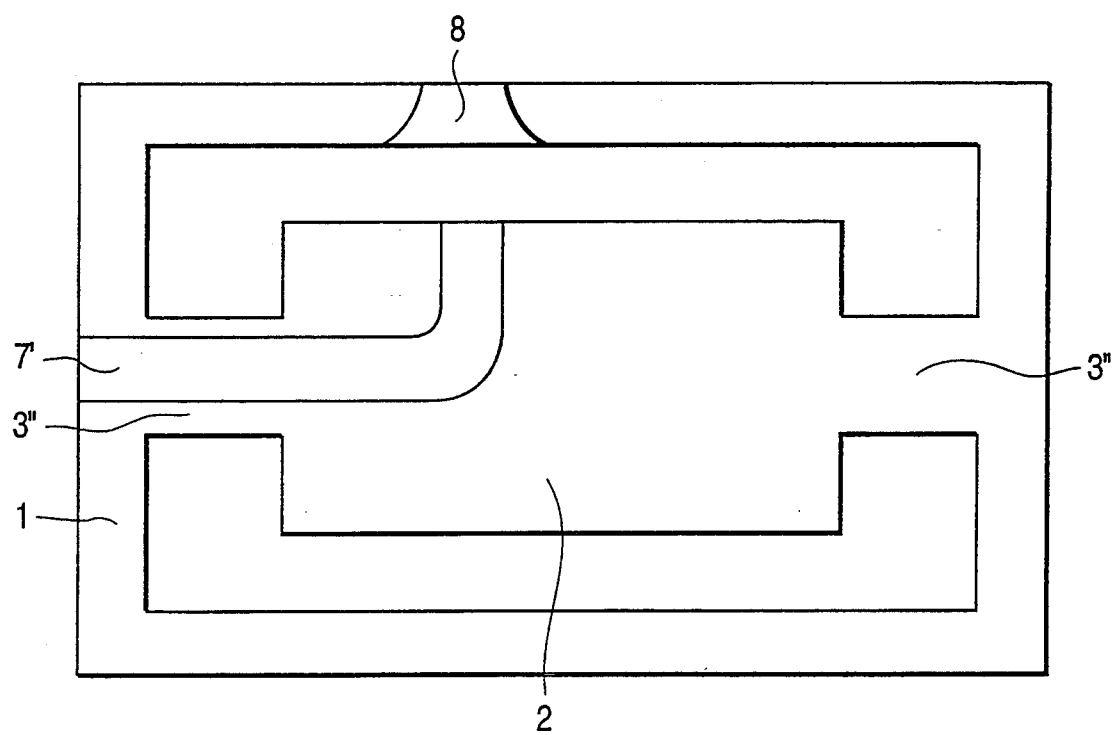

However, the present invention can also be employed for seismic masses 2' that, for example, are movably held by two oppositely disposed webs 3''. An example for this purpose is shown in FIG. 3c. As shown, the first optical waveguide 7' extends on the surface of seismic mass 2, which is held at opposite ends in frame 1 by the web 3'', with a change in direction toward a side of the seismic mass 2 where it is not held and where the waveguide 7' lies opposite the second light waveguide layer 8. This arrangement is particularly sensitive to torsional movements/accelerations.

Figure 4:
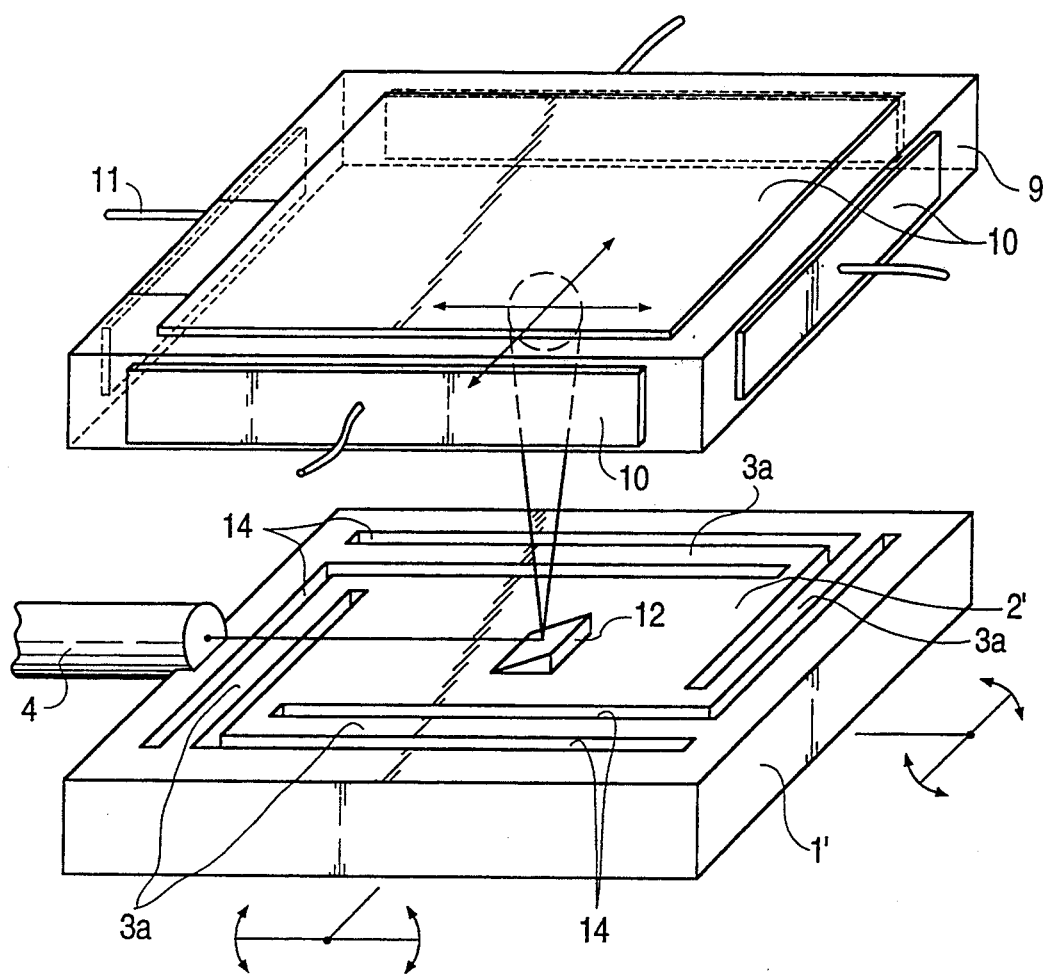
FIG. 4 is a schematic illustration of an embodiment of an alternative solution for the acceleration sensor according to the invention.

FIG. 4 shows an embodiment for a two-dimensional acceleration sensor. Four webs 3a which are mechanically weak, that is, sufficiently elastic, are provided in succession along the periphery of frame 1 and the mass 2' to provide a weak elastic suspension for the mass 2' in two directions. Such weak elastic suspensions may be realized, as shown in FIG. 4, in that each web 3a has a thickness of about 10 μm and extends from a respective corner of frame 1', to which the preceding web extends, along a respective side of the rectangular plate-shaped seismic mass 2' (of a thickness of approximately 500 μm). That is two pairs of parallel webs 3a are formed, with the webs 3a of a parallel pair being connected to the frame 1 along a diagonal of the mass 2'. For this purpose, four continuous right angle forming slots 14 (width approximately 100 μm) are etched into the rectangular silicon wafer so that, according to the drawing, one leg of each slot 14 extends parallel to a respective leg of another angle forming slot 14. In this way, seismic mass 2' (surface area approximately 1 mm×1 mm) as defined by the slots 14 is able to vibrate in two mutually perpendicular directions in one plane as indicated by the arrows.

A wedge-shaped mirror 12 is attached to the surface of seismic mass 2' to reflect the light, depending on the amplitude and direction of its deflection, to different locations of a position sensitive photodiode 9 disposed above the silicon wafer. If the seismic mass 2' has the correspondingly small geometry, its surface may also be etched under a corresponding angle (54°, as in the case above) so that no extra mirror (such as mirror 12) is required. Diode 9 is provided with metal contacts 10 and electronic terminals 11. The ratio of the photovoltages measured between the contacts on the top surface and the bottom surface, and the bottom side walls changes as a function of the point of incidence of the light beam. Therefore, since voltage quotients are measured, the position of the light beam can be determined substantially independently of intensity fluctuations. As already mentioned above, CCD diode arrays or position resolving photodetector arrangements are possible. In contrast to the previous embodiments, the deflection amplitude is here determined by way of location resolving detectors from the point of incidence on the detector surface.

Figure 5:
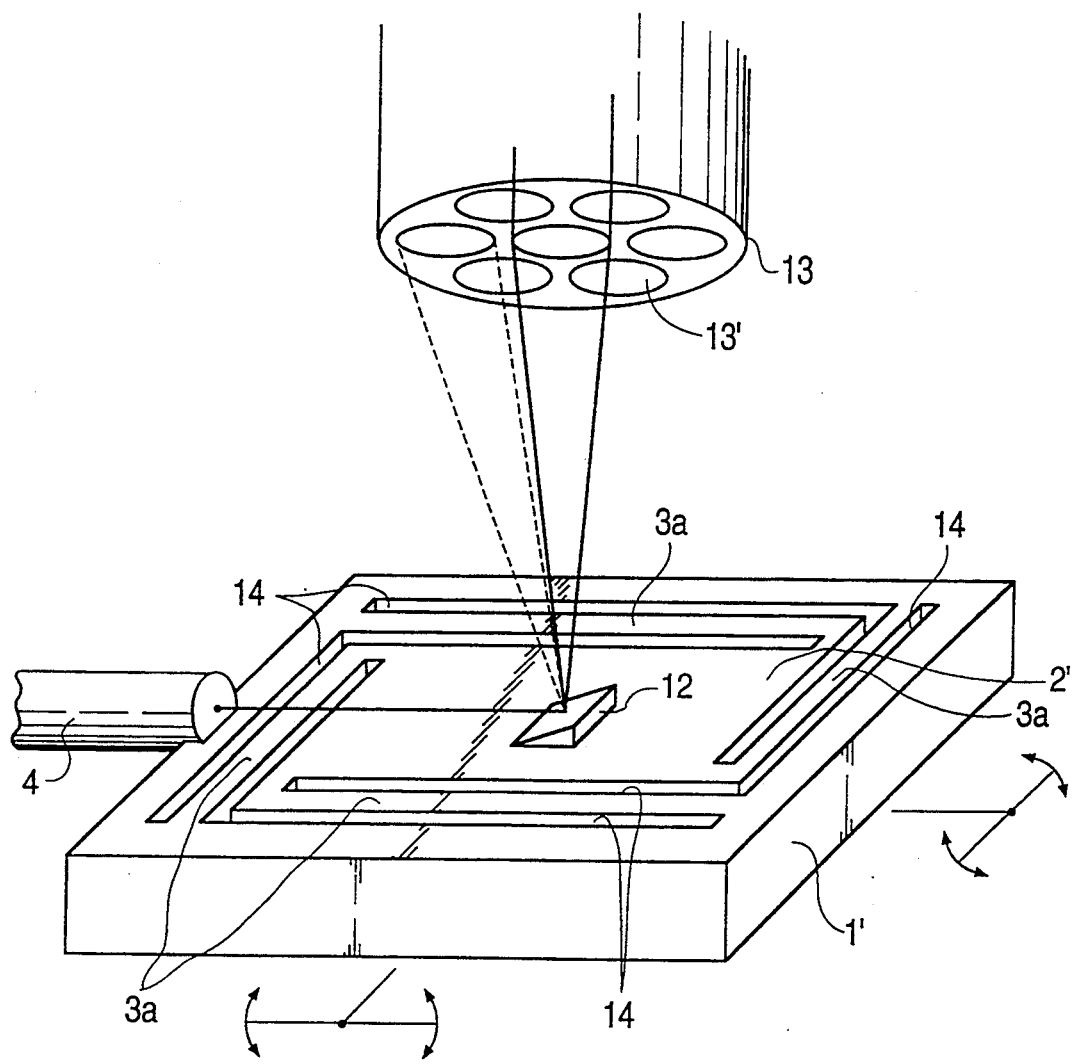
FIG. 5 schematically illustrates a modification of the embodiment of FIG. 4.

In a further embodiment shown in FIG. 5, the light beam reflected at seismic mass 2' is reflected into an optical fiber arrangement 13 which is disposed above the sensor, whose light incidence end is directed toward the seismic mass 2' and which includes several parallel arranged optical fibers 13'. When the mass 2' is at rest, the light impinges essentially on the middle fiber 13', while in the deflected state of the mass 2' the ends of other fibers 13' are illuminated more intensely so that corresponding photodetectors or detector arrays (not shown) connected to the outputs of the respective fibers are excited.

For all embodiments, an inherent self-testing function with respect to their optical components is provided. That is, if there is no deflection, the signal to be expected is well defined so that the absence of a signal would lead to the conclusion that there is a fault or a malfunction.

The mechanical stability of silicon monocrystalline structures is extremely good so that the sensors have a long service life in this respect and good stability. This also applies for the optical components that come primarily from the optical transmission art where they have been sufficiently tested and optimized. Their frequency behavior and the possibility of their use up to very high frequencies (for laser diodes or photodetectors up to the Gigahertz range) constitutes a further improvement.

In addition to the above embodiments which all employ optical waveguides and/or optical fibers, it is also possible to operate only with a light source, a detector device and a reflection device on the seismic mass.

Instead of using only one light source and only one photodetector, it is also possible to realize a plurality of light transmission paths, as already mentioned above in connection with the optical fiber embodiments. This also applies for embodiments which operate without optical fibers or waveguide layers.

The invention now being fully described, it will be apparent to one of ordinary skill in the art that any changes and modifications can be made thereto without departing from the spirit or scope of the invention as set forth herein.

What is claimed is:

1. An acceleration sensor for measuring accelerations in at least one direction comprising:
   a plate-like seismic mass that responds to accelerations, said seismic mass being disposed within a fixed frame and movably fastened to said frame by at least one web extending between said seismic mass and said frame;
   a first light waveguide for receiving a light beam from a light source, said first light waveguide including a first light waveguide layer disposed on a surface of said seismic mass and having an end disposed at an edge of said seismic mass, said first waveguide layer extending from said edge of said seismic mass across said at least one web and at least a portion of the width of a surface of said fixed frame so that a light beam passing through said first light waveguide layer is deflected as a function of movement of said seismic mass; and,
   at least one second light waveguide, disposed on said surface of said fixed frame opposite said end of said first light waveguide layer, for coupling the light beam to a detector for detecting deflections of the light beam as a measure of detected acceleration by the sensor, with said at least one second light waveguide comprising a further light waveguide layer extending from an inner edge of said fixed frame at least partially over said surface of said fixed frame.

2. An acceleration sensor as defined in claim 1, wherein: said frame is substantially coplanar with and surrounds said plate-like seismic mass; and said frame, said at least one web and said seismic mass are formed from a unitary member of the same material.

3. An acceleration sensor as defined in claim 1, wherein: said mass is rectangular; said at least one web is disposed along one edge surface of said seismic mass opposite said one edge of said mass; and said first light waveguide layer extends linearly to said edge of said mass.

4. An acceleration sensor as defined in claim 1 wherein: said mass is rectangular; said seismic mass is fastened to said frame by two webs extending respectively from two opposite parallel edge surfaces of said mass; and said first light waveguide layer extends to said edge of said seismic mass which is transverse to said two opposite edge surfaces.

5. An acceleration sensor as defined in claim 1, wherein: said first light waveguide layer extends only over a portion of the width of said frame; and said first light waveguide further includes an optical fiber which is coupled with said first light waveguide layer, and which is fastened on said surface of said fixed frame and extends from an edge of said fixed frame over a remaining width portion of said fixed frame.

6. An acceleration sensor as defined in claim 5, wherein said second light waveguide includes at least one further optical fiber which is fastened on said surface of said frame and coupled to an output end of said second light waveguide layer to transmit light to the detector.

7. An acceleration sensor as defined in claim 6, wherein said optical fiber of said first light waveguide and said further optical fiber of said second light waveguide each have a respective end portion which is adjacent and coupled to a respective one of said first waveguide layer and said second waveguide layer, and which is fastened in a respective recess formed in said surface of said frame.

8. An acceleration sensor as defined in claim 1, wherein said second light waveguide layer is wider, at least at an inner edge of said frame, than said opposite end of said first light waveguide layer.

9. An acceleration sensor as defined in claim 1, wherein said seismic mass, said at least one web and said frame are a unitary structure formed of silicon, and said first light waveguide layer and said second light waveguide layer are composed of one of silicon oxide, $Si_3N_4$, $A_2O_3$, $Ta_2O_5$ and $GeO_2$.

10. An acceleration sensor as defined in claim 1, wherein said seismic mass, said at least one web and said frame are a unitary structure formed of one of a punched metal sheet and a plastic.

11. An acceleration sensor as defined in claim 3 wherein: said at least one web includes three webs all disposed along said one edge surface of said seismic mass; and said first light waveguide layer extends over a central one of said three webs.

12. An acceleration sensor as defined in claim 9, wherein said seismic mass, said at least one web and said frame are a unitary structure formed from a single silicon chip.

* * * * *